Oct. 26, 1937.  T. PARKER  2,097,131
APPARATUS FOR THE MANUFACTURE OF SULPHURIC ACID
Original Filed March 6, 1935
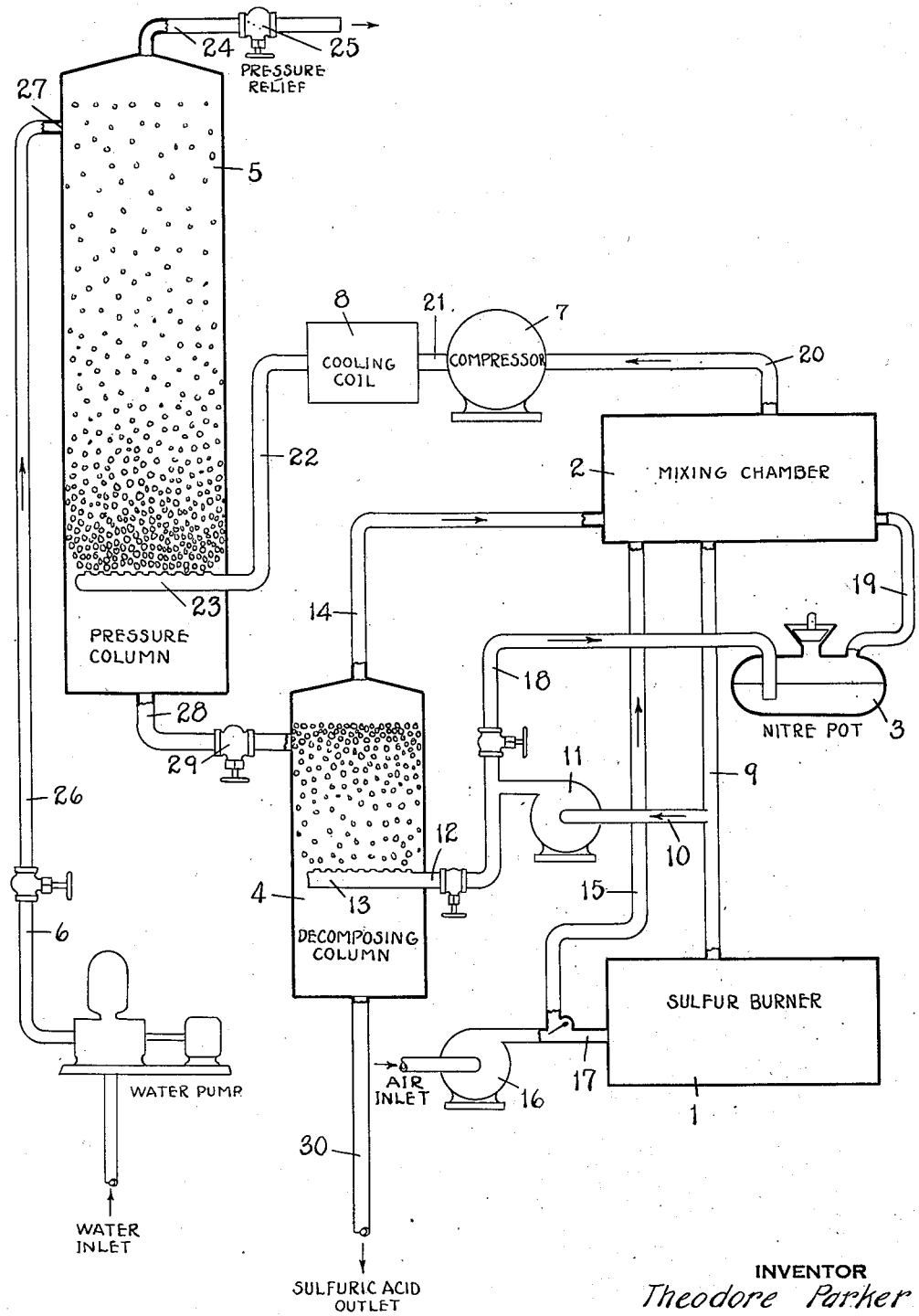
INVENTOR
Theodore Parker
BY
Chappell Earl
ATTORNEYS Patented Oct. 26, 1937

2,097,131

UNITED STATES PATENT OFFICE 2,097,131

APPARATUS FOR THE MANUFACTURE OF SULPHURIC ACID

Theodore Parker, Paw Paw, Mich.

Application March 6, 1935, Serial No. 9,541
Renewed April 5, 1937

5 Claims. (Cl. 23—261)

This invention relates to the manufacture of sulphuric acid and to apparatus therefor. For a full understanding of it reference should be made to an article entitled, "Pressure Synthesis a Possibility for Sulphuric Acid Manufacture", by Ernst Berl, in Chem. & Met. Eng., vol. 41, pages 571–575.

The objects of this invention are:

First, to provide a new and improved process and apparatus for the production of sulphuric acid.

Second, to produce such a process and apparatus that eliminates the extensive lead-lined chambers and towers of the well-known chamber process.

Third, to produce such a process and apparatus that will produce a very highly concentrated sulphuric acid.

Fourth, to produce such a process and apparatus that will be very economical of nitric oxide which is used in the carrying out of the reaction.

Other objects and advantages pertaining to details and economies of construction and operation will appear from the description to follow. The invention is pointed out in the claims.

In the drawing I show diagrammatically a plant for producing sulphuric acid by my method.

1 is a sulphur burner or the like. This may be of the conventional type of sulphur burner or can be a pyrites furnace or any other suitable source of sulphur dioxide. 2 is a mixing space or chamber, 3 is a niter pot of usual construction, 4 is a bubble tower for the decomposition of the intermediate product for the release of the sulphuric acid, 5 is a bubble tower for carrying out the main reaction of the process, 6 is a source of water, 7 is a compressor and 8 is a cooling coil for cooling gases passing from the compressor.

9 is a suitable conduit connecting the sulphur burner with the mixing chamber 2. It has a branch conduit 10 provided with a blower 11 which may or may not be employed as desired. 12 is a connection from the blower 11 to the bubble tower 4. This connection ends in a perforated member 13 which is positioned adjacent the bottom of the tower. 14 is a connection from the top of the bubble tower 4 to the mixing space. 15 is an air connection from a blower 16 to the mixing space or chamber 2 which may or may not be necessary, and 17 is a connection from the blower 16 to the sulphur burner for providing air for the burning of the sulphur or pyrites. It will be appreciated by those skilled in the art that I am merely illustrating the matters herein diagrammatically and that the connections may be any conduits suitable for the particular material to be conveyed.

18 is a connection for conveying sulphur dioxide to the niter pot 3 and 19 is a suitable conduit from the niter pot to the mixing chamber or space 2. This conduit is arranged so that the blower 11 will force the gas from the sulphur burner to the niter pot and from there to the mixing space. 20 is a suitable conduit or connection from the mixing space or chamber 2 to the compressor 7. The compressor is of any suitable type and discharges through a conduit 21 to the cooler 8. This can be of any suitable type and discharges through a conduit or pipe 22 to the bubble tower 5 and terminates in a suitable perforated member 23 which is located adjacent the bottom of the tower 5. At the upper end of bubble tower 5 is an exhaust conduit 24 which is provided with a suitable reducing valve 25 which permits discharge into the atmosphere of waste gas from the bubble tower without loss of working pressure therein.

26 is a suitable pipe or connection from the source of water 6 and discharges at the point 27 adjacent the top of the bubble tower 5. A conduit 28 leads from the bottom of the bubble tower 5 to reducing valve 29 which permits the passage of material from the bubble tower 5 to the bubble tower 4 without loss of working pressure. 30 is a suitable discharge from the bottom of the bubble tower 4.

Carrying out my process, sulphur dioxide is produced in the sulphur burner 1. Ordinarily an excess of oxygen is present after the combustion of the sulphur and the gases pass through conduit 9 to the mixing space or chamber 2. In the mixing space or chamber nitric oxide is mixed with the sulphur dioxide and oxygen. This nitric oxide is obtained from the bubble tower 4 through the conduit 14 as a result of a reaction which will later be explained.

In carrying out the process, I so control the proportions of nitric oxide and sulphur dioxide in the mixing chamber that they occur by weight in the proportions of their molecular weights and I control the proportion of oxygen present so that after oxidation of the nitric oxide to nitrogen dioxide there is but a slight excess, if any, of the uncombined oxygen. In controlling the oxygen, I may, if necessary, admit air through conduit 15 if a sufficient excess of oxygen is not provided from the sulphur burner. As a result of this, before any reaction in the mixing chamber, I have nitric oxide, oxygen and sulphur dioxide in the mixing chamber in the proportions of two molecular weights of nitric oxide and sulphur dioxide to one molecular weight of oxygen. In using my apparatus the nitric oxide is oxidized to nitrogen dioxide. This reaction is $$2NO + O_2 = 2NO_2$$

The sulphur dioxide and the other gases are by weight in proportion to their molecular weights.

In the compressor 7 the mixture of gases is compressed to a compression sufficient for maintaining the pressure in the bubble tower 5 at a point such that hydroxy nitrosulphonic acid formed therein will not decompose at the temperature there employed. It is desirable to carry out the reaction in the bubble tower 5 at about 50° C., although variations of this, depending upon the pressure, will be obvious to those skilled in the art.

In order to maintain the temperature in the bubble tower 5 at 50° C. it is necessary to cool the compressed gases from the compressor in the cooler 8, the amount of cooling depending upon the temperature of the water admitted through the conduit 26 to the bubble tower 5. It is only necessary to maintain the gases at such temperature that the resulting temperature in the bubble tower 5 will be 50° C. A stream of water passes through the bubble tower 5 from the top to the bottom and the sulphur dioxide and nitrogen dioxide are admitted through perforated member 23 and are allowed to bubble through the stream of water passing through the bubble tower 5 countercurrent thereof. The bubble tower is of sufficient height to permit substantially complete reaction of the gases with the water before they reach the top of the column. Any atmospheric nitrogen, of course, would not react with the water and would be released through the reducing valve 25. It is essential to the process that the pressure be maintained in the bubble tower 5 at all times. This is accomplished by means of compressor 7 and the reducing valves 25 and 29.

In the bubble tower 5 the sulphur dioxide and nitrogen dioxide react with water to form hydroxy nitrosulphonic acid which is also known as violet acid. The violet acid is passed through the reducing valve 29 to the bubble tower 4 through the conduit 28. The pressure in the bubble tower 4 is at atmospheric pressure or can be at any pressure at which the decomposition of the hydroxy nitrosulphonic acid readily occurs.

The reaction in the bubble tower 5 is $$NO_2 + SO_2 + H_2O = H_2SO_3NO_2$$

The reaction in the bubble tower 4 is the decomposition of the hydroxy nitrosulphonic acid and is as follows:

$$H_2SO_3NO_2 = H_2SO_4 + NO$$

If any difficulty is had in bringing about this decomposition in the bubble tower 4, the bubbling of hot gases therethrough will speed up the reaction. To this end, if desired, the hot gases from the sulphur burner 1 can be passed through the conduit 10—12 through the perforated member 13.

The nitric oxide given off in this reaction passes through the conduit 14 to the mixing space or chamber 2 to be re-used in a new cycle. The sulphuric acid is drawn off through conduit 30 and in carrying out this process highly concentrated, substantially pure sulphuric acid is obtained at this point.

In carrying out the process it is necessary that the amount of oxygen admitted to the mixing space or chamber 2 be very carefully controlled. Any excess of oxygen in this chamber will result in the formation in bubble tower 5 of nitrosylsulphuric acid ($HSO_3NO_2$). The production of this acid is very undesirable as it somewhat complicates the process, although the production of it is not fatal to the carrying on of the reactions. If an excess of oxygen is present in the gases passing to the bottom of the bubble tower 5 from the compressor 7, the nitrosylsulphuric acid is formed in the bubble tower 5.

$$4NO_2 + O_2 + 4SO_2 + 2H_2O = 4HSO_3NO_2$$

If the nitrosylsulphuric acid forms in the bubble tower 5, it is necessary to have enough excess water present to carry this acid in solution with the hydroxy nitrosulphonic acid to the top of the bubble tower 4. It is then necessary to have the hot sulphur dioxide from the sulphur burner 1 pass to the bottom of the bubble tower 4 to react with the nitrosylsulphuric acid and the water. This reaction is $$2HSO_3NO_2 + 2H_2O + SO_2 = H_2SO_4 + 2H_2SO_3NO_2$$
$$2H_2SO_3NO_2 = 2H_2SO_4 + 2NO$$

In carrying out the process it will be sometimes necessary to add additional nitric acid or nitrogen dioxide to make up for losses in carrying out the process. To this end the niter pot 3 is provided which is of a construction sometimes employed in the chamber process. In it are placed sodium nitrate and sulphuric acid in solution with water. When sulfur dioxide is passed from the sulphur burner 1 through conduits 10 and 18, the reaction produces nitric oxide or nitrogen dioxide.

Having thus described my invention, what I claim as new and desire to secure by Letters Patent is:

1. An apparatus for producing sulphuric acid comprising a sulphur burner or the like, a mixing space, a decomposition bubble tower, a connection from the sulphur burner to the mixing space, a connection from the sulphur burner to a point adjacent the bottom of the decomposition bubble tower, a connection from the top of the decomposition bubble tower to the mixing space, a compressor, a connection from the mixing space to the compressor, a cooler, a connection from the compressor to the cooler, a reaction bubble tower, a connection from the cooler to a point adjacent the bottom of the reaction bubble tower, a source of water, a connection from the source of water to the top of the reaction bubble tower, an exhaust at the top of the reaction bubble tower having a reducing valve, a connection from the bottom of the reaction bubble tower to the top of the decomposition bubble tower and having a reducing valve therein, a withdrawal opening adjacent the bottom of the decomposition bubble tower, a niter pot, a connection from the sulphur burner to the niter pot, a connection from the niter pot to the mixing space.

2. An apparatus for producing sulphuric acid comprising a sulphur burner or the like, a mixing space, a decomposition bubble tower, a connection from the sulphur burner to the mixing space, a connection from the sulphur burner to a point adjacent the bottom of the decomposition bubble tower, a connection from the top of the decomposition bubble tower to the mixing space, a compressor, a connection from the mixing space to the compressor, a cooler, a connection from the compressor to the cooler, a reaction bubble tower, a connection from the cooler to a point adjacent the bottom of the reaction bubble tower, a source of water, a connection from the source of water to the top of the reaction bubble tower, an exhaust at the top of the reaction bubble tower having a reducing valve, a connection from the bottom of the reaction bubble tower to the top of the decomposition bubble tower and having a reducing valve therein, and a withdrawal opening adjacent the bottom of the decomposition bubble tower.

3. An apparatus for producing sulphuric acid comprising a sulphur burner or the like, a mixing space, a decomposition bubble tower, a connection from the sulphur burner to the mixing space, a connection from the sulphur burner to a point adjacent the bottom of the decomposition bubble tower, a connection from the top of the decomposition bubble tower to the mixing space, a compressor, a connection from the mixing space to the compressor, a reaction bubble tower, a connection from the compressor to a point adjacent the bottom of the reaction bubble tower, a source of water, a connection from the source of water to the top of the reaction bubble tower, an exhaust at the top of the reaction bubble tower having a reducing valve, a connection from the bottom of the reaction bubble tower to the top of the decomposition bubble tower and having a reducing valve therein, and a withdrawal opening adjacent the bottom of the decomposition bubble tower.

4. An apparatus for producing sulphuric acid comprising a sulphur burner or the like, a mixing space, a decomposition bubble tower, a connection from the sulphur burner to the mixing space, a connection from the top of the decomposition bubble tower to the mixing space, a compressor, a connection from the mixing space to the compressor, a cooler, a connection from the compressor to the cooler, a reaction bubble tower, a connection from the cooler to a point adjacent the bottom of the reaction bubble tower, a source of water, a connection from the source of water to the top of the reaction bubble tower, an exhaust at the top of the reaction bubble tower having a reducing valve, a connection from the bottom of the reaction bubble tower to the top of the decomposition bubble tower and having a reducing valve therein, and a withdrawal opening adjacent the bottom of the decomposition bubble tower.

5. An apparatus for producing sulphuric acid comprising a sulphur burner or the like, a mixing space, a decomposition bubble tower, a connection from the sulphur burner to the mixing space, a connection from the top of the decomposition bubble tower to the mixing space, a compressor, a connection from the mixing space to the compressor, a reaction bubble tower, a connection from the compressor to a point adjacent the bottom of the reaction bubble tower, a source of water, a connection from the source of water to the top of the reaction bubble tower, an exhaust at the top of the reaction bubble tower having a reducing valve, a connection from the bottom of the reaction bubble tower to the top of the decomposition bubble tower and having a reducing valve therein, and a withdrawal opening adjacent the bottom of the decomposition bubble tower.

THEODORE PARKER.